F. OAKLEY.
Machines for Washing Currants, &c.
No. 146,470.  Patented Jan. 13, 1874.
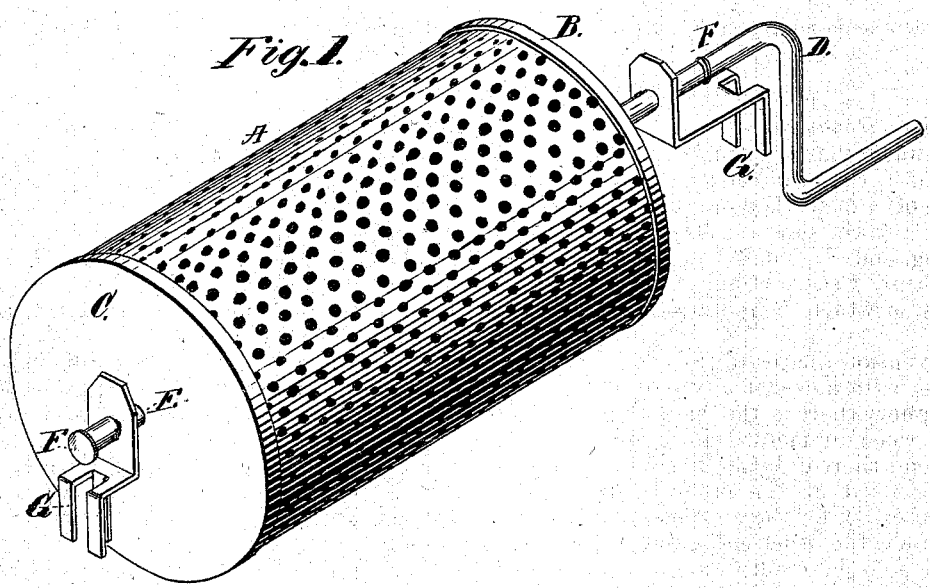
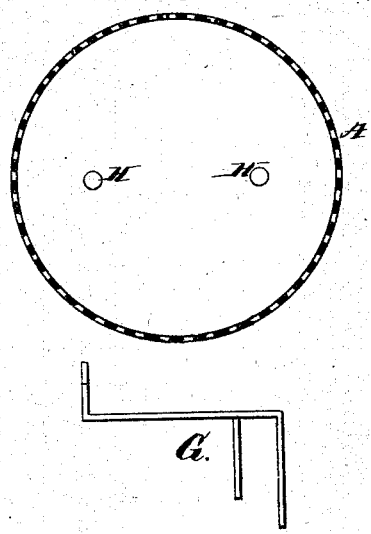
Witnesses.  
J. Kearson Morgan  
J. D. Grooes
Inventor:  
Frederick Oakley

UNITED STATES PATENT OFFICE.

FREDERICK OAKLEY, OF TORONTO, CANADA.

IMPROVEMENT IN MACHINES FOR WASHING CURRANTS, &c.

Specification forming part of Letters Patent No. 146,470, dated January 13, 1874; application filed May 14, 1873.

*To all whom it may concern:*

Be it known that I, FREDERICK OAKLEY, of the city of Toronto, in the county of York and Province of Ontario, Canada, carpenter, have invented a certain new and useful Machine for Cleansing and Washing Currants and other Small Fruit, Pease, Grain, &c., for culinary purposes, of which the following is a specification:

My invention relates to the combination of a cylinder with holes of any required size on the periphery thereof, the ends thereof being made of wood or metal—tin, by preference—the one end thereof being fixed to the cylinder, and fitted at the outer center with a shaft and crank for the purpose of revolving the cylinder, the other end thereof being adjusted so as to be readily put on and removed, in order to charge the cylinder, and to remove the contents when washed, the said movable end being fitted with a shaft similar to the one on the other end, but wanting as to the crank, collars or shoulders being made on the shafts to hinder too much play, and two or more tubes or rods being fastened to one or each of the inner side of the ends of the said cylinder, and parallel to said cylinder, with the object of separating the bulk of the contents of the cylinder, and distributing the same more perfectly.

To the shaft or axle at each end of the said cylinder a bearing may be fitted, bent as shown in the drawing, and also cut so as to be fitted to the lip of a pail or other vessel to contain water.

If preferred, a trough or vessel may be constructed with bearings on the lip or edge, into which the shaft may be run, the bent bearings being, however, serviceable where it is convenient to use the washer in a vessel not specially constructed for that purpose.

Figure 1 is a side elevation of the machine embodying my invention. Fig. 2 is an elevation, showing the tubes or rods attached thereto. Fig. 1, A is the perforated cylinder, with the fixed end, B, and movable or adjustable end, C; D being the axle or shaft with crank attached to fixed end, and E the shaft or axle attached to movable end, F F being shoulders or collars on shafts, and G G being adjustable bearings, bent so as to fit readily to any pail or other vessel. Fig. 2, H H are the rods or tubes to separate the contents of the cylinder as it revolves. The shafts or axles D E are hung in adjustable bearings, so that the machine may be suspended in and fitted to vessels of various sizes.

When it is required to use the machine, the movable end may be taken off, and the cylinder charged with the requisite substance to be cleaned or washed, and the end replaced, the whole machine being then suspended in a vessel by means of the bent bearings, if a pail or other ordinary vessel be used; but if in a trough made on purpose, the bent bearings may be dispensed with, and the shafts run in fixed bearings fitted to the edges or lips of said trough, when, water being poured in the vessel so as to immerse the machine sufficiently deep, and the shaft revolved, the dirt, stalks, and other impurities are allowed to pass through the perforated sides, and the contents are rendered clean.

I do not claim any of the parts separately, but only a combination of them, for the purposes mentioned.

What I claim as my invention, and desire to secure by Letters Patent, is—

The combination of the perforated cylinder A, having movable end C, with the tubes or rods H, together with axles or shafts D E, and crank, with adjustable bearings G G, substantially as described, and for the purposes above mentioned.

FREDERICK OAKLEY.

Witnesses:
T. KEARTON MORGAN,
T. D. GROVES.